(12) United States Patent
Kobayashi

(10) Patent No.: US 7,810,999 B2
(45) Date of Patent: Oct. 12, 2010

(54) METAL BEARING

(75) Inventor: Hiroshi Kobayashi, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 79 days.

(21) Appl. No.: 12/298,841

(22) PCT Filed: Apr. 28, 2006

(86) PCT No.: PCT/JP2006/309039

§ 371 (c)(1), (2), (4) Date: Oct. 28, 2008

(87) PCT Pub. No.: WO2007/125603

PCT Pub. Date: Nov. 8, 2007

(65) Prior Publication Data

US 2009/0116773 A1 May 7, 2009

(51) Int. Cl.
*F16C 17/00* (2006.01)
*F16C 33/74* (2006.01)
*F16C 33/02* (2006.01)

(52) U.S. Cl. ........................ 384/129; 384/133; 384/279

(58) Field of Classification Search ................ 384/129, 384/133, 276, 279, 286, 288, 289
See application file for complete search history.

(56) References Cited

U.S. PATENT DOCUMENTS

| 5,645,355 | A | * | 7/1997 | Tokushima et al. | .......... 384/133 |
| 5,789,836 | A | * | 8/1998 | Hayakawa | .................... 310/90 |
| 6,277,298 | B1 | | 8/2001 | Borduz et al. | |
| 6,475,687 | B2 | * | 11/2002 | Hayashi et al. | .......... 430/106.2 |
| 6,669,371 | B2 | | 12/2003 | Tanaka et al. | |

FOREIGN PATENT DOCUMENTS

| JP | 7 63220 | 3/1995 |
| JP | 8 298747 | 11/1996 |
| JP | 2002 39183 | 2/2002 |
| JP | 2002 180162 | 6/2002 |
| JP | 2003 513156 | 4/2003 |

\* cited by examiner

*Primary Examiner*—Thomas R Hannon
*Assistant Examiner*—Phillip A Johnson
(74) *Attorney, Agent, or Firm*—Oblon, Spivak, McClelland, Maier & Neustadt, L.L.P.

(57) ABSTRACT

A metal bearing having a long operating life that is not affected by the operating temperature. The metal bearing includes a bearing surface capable of slidably contacting with a shaft member, including pores in a surface and interior thereof, and being composed of a sintered compact having a metal or alloy as a main component. A dispersion solvent is provided inside the pores, and maghemite particles exist in the dispersion solvent together with at least one of a gas and a liquid that has a boiling point lower than a boiling point of the dispersion solvent.

12 Claims, 2 Drawing Sheets

METAL BEARING

TECHNICAL FIELD

The present invention relates to a metal bearing that has a bearing surface capable of slidably contacting with a shaft member, and has pores on the surface and the inside thereof, and that is composed of a sintered compact having a metal or alloy as the primary component thereof.

BACKGROUND ART

Known conventional metal bearings having a metal or alloy sintered compact as the main component thereof include oil-retaining bearings in which a lubricating oil is impregnated into a sintered compact (see Patent Document 1, for example). This type of metal bearing has self-lubricating properties, and the lubricating oil impregnated into the sintered compact can be made to exude onto the bearing surface by the exothermic heating or other effects that occur when the shaft member slides against the bearing surface.

Other metal bearings that have been proposed include a graphite-dispersion-type Cu-based sintered alloy bearing in which a copper-phosphorus alloy and graphite particles are mixed with copper-nickel-based alloy powder in a ball mill or the like, press-molded, and sintered (see Patent Document 2, for example). In such a metal bearing, excellent abrasion resistance can be demonstrated by the copper-nickel-based alloy having high strength and excellent corrosion resistance, as well as by the rigid copper-phosphorous alloy and the loose graphite having high lubricity.

Patent Document 1: Japanese Patent Application "Kokai" No. 2002-39183 (Prior Art)

Patent Document 2: Japanese Patent Application "Kokai" No. 2002-180162 (pp. 3 and 4)

DISCLOSURE OF THE INVENTION

Problem to be Solved by the Invention

However, in the conventional oil-impregnated bearing in which a lubricating oil is impregnated into a sintered compact, the vapor pressure of the lubricating oil is low (the surface tension is high) at low temperatures, thermal contraction of the volume of the lubricating oil and other effects make it difficult for the lubricating oil impregnated into the sintered compact to adequately exude onto the bearing surface, and the self-lubricating properties are reduced. Drawbacks therefore occur in that the pores of the sintered compact are destroyed by sintering, partial contact, or the like in the sliding surface of the bearing and the shaft member. The self-lubricating properties of the bearing are severely reduced, particularly when the operating temperature is −30° C. or below.

At high temperatures, the vapor pressure of the lubricating oil is high (the surface tension is low), and such effects as increased thermal expansion of the lubricating oil cause the lubricating oil impregnated into the sintered compact to easily exude, and the lubricating oil to dry up during prolonged use. There is therefore a risk of the pores of the sintered compact becoming destroyed by sintering, partial contact, or the like at the sliding surface of the bearing and the shaft member during a low-temperature operation as well as during high-temperature operation. The time of continuous operation of the bearing is limited, particularly when the operating temperature is 100° C. or higher.

The volume ratio of the pores provided to the surface and inside of the metal or alloy sintered compact used in the bearing is usually about 17 to 23 vol %, and the volume of lubricating oil that can be impregnated into the pores is limited.

Furthermore, the pores of the sintered compact on the bearing surface are also destroyed, and the lubricating oil does not easily exude when there is interference between the bearing and the shaft member supported by the bearing. The inside diameter of the bearing and the outer dimensions of the shaft member must therefore be manufactured with high accuracy, and drawbacks occur in that the manufacturing cost increases.

In the aforementioned graphite-dispersion-type Cu-based sintered alloy bearing, since the graphite powder is mixed with the copper-nickel-based alloy powder by merely using a ball mill, the graphite is dispersed in the form of lumps. Drawbacks therefore occur in that the graphite is not uniformly applied to the bearing surface.

Furthermore, when the sintered compact is one in which graphite particles are adhered to the surfaces of the metal particles, since the metal and graphite have markedly different melting points, melting at the surfaces of contact between the metal particles is obstructed by the presence of the graphite. Drawbacks therefore occur in that the mechanical strength of the sintered compact is significantly reduced.

When the bearing is used in an automobile motor, the temperature of the operating environment of the automobile motor ranges widely, the temperature of the operating environment also varies according to the position in which the motor is mounted, and the temperature of the operating environment of the motor ranges from about −40 to 120° C. The temperature is further increased by the sliding of the shaft member on the bearing surface of the bearing, and can be about 30 to 50° C. higher than the operating environment temperature of the motor. There is therefore a need for a bearing capable of maintaining lubricity of the bearing surface in a wide range of temperatures when the bearing is used in an automobile motor.

An automobile motor bearing is generally used for ten or more years without maintenance.

Furthermore, in cases in which the operating temperature range of the bearing is wide or the usage time is long, a ball bearing (also referred to as a rolling bearing) may be used instead of an oil-impregnated bearing (also referred to as a sliding bearing) in such cases as when the shaft member and the bearing cannot be avoided from interfering with each other, but cost increases when a ball bearing is used. Since a ball bearing requires a large mounting space, the unit as such in which the ball bearing is used also increases in size, and the ability to mount the unit may be reduced.

The present invention was devised in view of the foregoing drawbacks, and an object of the present invention is to provide a metal bearing that has a long operating life and is unaffected by the operating temperature.

Means for Solving the Problems

In a first aspect of the metal bearing according to the present invention for achieving the abovementioned objects, there is provided a metal bearing that comprises a bearing surface capable of slidably contacting with a shaft member, has pores in a surface and interior thereof, and is composed of a sintered compact having a metal or alloy as a main component; wherein a dispersion solvent is provided inside the pores, and maghemite particles exist in the dispersion solvent together with at least one of a gas and a liquid that has a boiling point lower than a boiling point of the dispersion solvent.

That is to say, according to this configuration, when the temperature of the bearing surface increases due to such effects as sliding of the shaft member, the temperature of the pores also increases in sequence from the area proximal to the bearing surface. In the interior of pores that are at or above a certain temperature, when the maghemite particles coexist with a liquid in the dispersion solvent, the liquid evaporates and forms balloons as bubbles that envelop the maghemite particles, and when the maghemite particles coexist with a gas in the dispersion solvent, the gas forms balloons that envelop the maghemite particles. Since the balloons enveloping the maghemite particles exist in the pores in which the dispersion solvent serves as a medium, the volume of the balloons is prevented from expanding by the surrounding dispersion solvent, and the pressure inside the balloons increases when thermal expansion tends to occur in conjunction with an increase in temperature inside the pores. When the internal pressure reaches atmospheric pressure due to a further temperature increase, the balloons move from within the pores to the bearing surface along with the maghemite particles.

The maghemite particles have a high coercive force, and therefore have pronounced qualities as a permanent magnet and possess high magnetic adsorption force. On the other hand, the maghemite particles have a low saturation flux density, and therefore have low magnetic cohesion force between particles, and the magnetic cohesion of the particles is easily released. The maghemite particles that have moved to the bearing surface are therefore stressed by the sliding contact with the bearing and the shaft member, the bonds due to magnetic cohesion force between the maghemite particles are released, and the particles become finer particles and are magnetically adsorbed on the bearing surface. The fine particles of maghemite can thereby form a coating structure (hereinafter referred to as a coating) on the bearing surface, and can be used as the medium through which bearing effects are obtained.

Since a coating can be formed by causing the maghemite particles to be magnetically adsorbed on the bearing surface in this manner, there is no need to provide a continuous supply of lubricating oil or the like from the metal bearing to the shaft member or other parts of the metal bearing by using the self-lubricating properties based on the thermal expansion of the impregnated oil, as in a conventional oil-impregnated bearing or the like. Furthermore, due to the interposition of the maghemite particles in the gap between the metal bearing and the shaft member by magnetic adsorption, sintering is prevented by the slipping of the maghemite particles in the plane of sliding contact between the metal bearing and the shaft member, and lubricity can be maintained over a long period of time.

Consequently, since the metal bearing thus configured enables a coating of maghemite particles to be formed on the bearing surface, a metal bearing can be provided that has a long operating life and is not affected by the operating temperature. Because the bearing and the shaft member can also be prevented from directly interfering with each other by the coating of maghemite particles, there is no longer a need for high manufacturing accuracy, and the manufacturing cost can be kept low.

In a second aspect of the metal bearing according to the present invention, an average grain size of the maghemite particles is 0.3 μm or less.

That is to say, according to this aspect, since the saturation magnetization of a single particle decreases as the average grain size decreases, the magnetic cohesion of the maghemite particles becomes easier to release.

In a third aspect of the metal bearing according to the present invention, a BET value of the maghemite particles is 10 $m^2/g$ or higher.

That is to say, according to this aspect, a larger amount of gas or liquid can be associated with the surfaces of the maghemite particles.

In a fourth aspect of the metal bearing according to the present invention, the maghemite particles are obtained by heat treating and magnetically transforming magnetite particles.

That is to say, according to this aspect, it is possible to fabricate maghemite particles that are granular or spherical and have high coercive force and low saturation flux density.

In a fifth aspect of the metal bearing according to the present invention, a surface of the maghemite particles is provided with at least one type of compound selected from a titanium-based coupling agent and a silane-based coupling agent.

That is to say, according to this aspect, the surfaces of the maghemite particles are made hydrophobic by at least one compound selected from a titanium-based coupling agent and a silane-based coupling agent, whereby the dispersion properties of the maghemite particles in the hydrophobic dispersion solvent can be enhanced, and the gas enveloping the maghemite particles can be prevented from being released from the maghemite particles.

In a sixth aspect of the metal bearing according to the present invention, the dispersion solvent is a poly-alpha-olefin.

That is to say, according to this aspect, the maghemite particles can be satisfactorily dispersed in a wide range of temperatures. Since a poly-alpha-olefin also has excellent lubricity, a poly-alpha-olefin that has moved to the bearing surface together with the maghemite particles can be made to act as a lubricant between the bearing and the shaft member.

BEST MODE FOR CARRYING OUT THE INVENTION

The metal bearing according to the present invention is a metal bearing that comprises a bearing surface capable of slidably contacting with a shaft member, has pores in a surface and interior thereof, and is composed of a sintered compact having a metal or alloy as a main component, wherein a dispersion solvent is provided inside the pores, and maghemite particles exist in the dispersion solvent together with at least one of a gas and a liquid that has a boiling point lower than a boiling point of the dispersion solvent. Specifically, in the metal bearing according to the present invention, when the temperature of the bearing surface increases due to such effects as sliding of the shaft member, the temperature of the pores also increases in sequence from the area proximal to the bearing surface. In the interior of pores that are at or above a certain temperature, when the maghemite particles exist with a liquid in the dispersion solvent, the liquid evaporates and forms balloons as bubbles that envelop the maghemite particles, and when the maghemite particles exist with a gas in the dispersion solvent, the gas forms balloons that envelop the maghemite particles. Since the balloons enveloping the maghemite particles exist in the pores in which the dispersion solvent serves as a medium, the volume of the balloons is prevented from expanding by the surrounding dispersion solvent, and the pressure inside the balloons increases when there thermal expansion tends to occur in conjunction with an increase in temperature inside the pores. When the internal pressure reaches atmospheric pressure due to a further temperature increase, the balloons move from within the pores to the bearing surface along with the maghemite particles. In the metal bearing according to the present invention, the increase in the temperature inside the pores with closer proximity to the bearing surface is utilized to realize a self-lubricating mechanism by causing balloons to move to the bearing surface in order of proximity to the bearing surface that has reached a certain internal pressure.

Such maghemite particles have a high coercive force, and therefore have pronounced qualities as a permanent magnet and possess high magnetic adsorption force. On the other hand, the maghemite particles have a low saturation flux density, and therefore have low magnetic cohesion force between particles, and the magnetic cohesion of the particles is easily released. The maghemite particles that have moved to the bearing surface are therefore stressed by the sliding contact with the bearing and the shaft member, the bonds due to magnetic cohesion force between the maghemite particles are released, and the particles become finer particles and are magnetically adsorbed on the bearing surface. The fine particles of maghemite can thereby form a coating on the bearing surface, and can be used as the medium through which bearing effects are obtained.

When the dispersion solvent moves together with the maghemite particles to the bearing surface, deviations form in the gap between the bearing and the shaft member when the dispersion solvent is subjected to a load from the shaft member, and a pressure distribution in the oil film is formed in accordance with the deviations. As a result, the dispersion solvent forms a liquid lubrication layer, whereby self-lubrication effects can be demonstrated. Furthermore, the dispersion solvent receives stress that moves in the rotation direction of the shaft member due to the rotation of the shaft member and the pressure distribution of the oil film formed by the load of the shaft member, and the maghemite particles adhered to the bearing and the shaft member move in the rotation direction of the shaft member. The dispersion solvent that has moved to the bearing surface in this manner can thus be made to act together with the maghemite particles as a lubricant for lubricating the gap between the bearing and the shaft member.

Since a coating can be formed by causing the maghemite particles to become magnetically adsorbed on the bearing surface in this manner, there is no need to provide a continuous supply of lubricating oil or the like from the metal bearing to the shaft member or other parts of the metal bearing by using the self-lubricating properties based on thermal expansion of the impregnated oil, as in a conventional oil-impregnated bearing or the like. Furthermore, due to the interposition of the maghemite particles in the gap between the metal bearing and the shaft member by magnetic adsorption, sintering is prevented by the slipping of the maghemite particles in the plane of sliding contact between the metal bearing and the shaft member, and lubricity can be maintained over a long period of time.

Consequently, since the metal bearing according to the present invention enables a coating of maghemite particles to be formed on the surface of sliding contact between the bearing and the shaft member, a metal bearing can be provided that has a long operating life and is not affected by the operating temperature. Since the maghemite particles are also used as a lubricating material, the operating temperature no longer makes it difficult for the lubricating oil to exude onto the bearing surface, as in the conventional oil-impregnated bearing, and drying up of the lubricating oil, and other problems can be eliminated. Furthermore, because the bearing and the shaft member can also be prevented from directly interfering with each other by the coating of maghemite particles, there is no longer a need for high manufacturing accuracy, and the manufacturing cost can be kept low. The maghemite particles are also dispersed on the entire bearing surface in conjunction with the discharge of gas on the entire bearing surface, and can therefore be uniformly magnetically adsorbed on the surface of sliding contact between the bearing and the shaft member.

The maghemite particles used in the present invention are not particularly limited, and preferably have the characteristics described below, for example.

1. Particle Shape

The maghemite particles are preferably spherical or granular. When the maghemite particles have such a shape, stress is easily mitigated when magnetically cohered maghemite particles as such are subjected to stress from the bearing and the shaft member. Specifically, spherical and granular particles magnetically cohere with each other in a nearly point-contacting state. The maghemite particles on the bearing surface are therefore subjected to compression, shear, tension, and various other types of stress from the bearing and the shaft member, whereby the cohesion of particles is released, and a coating of maghemite particles can easily be formed in the gap between the bearing and the shaft member. Since spherical and granular particles have a small surface area of contact with the surface of sliding contact between the bearing and the shaft member, the particles act so as to slide in a magnetically adsorbed state when stress is applied to the particles. The cohesion of the maghemite particles is preferably released to a degree at which the particles are nearly singular. The maghemite particles magnetically adsorbed on the surface of sliding contact of the shaft member and the bearing thereby easily slide, and solid lubricating effects capable of mitigating stress received from the shaft member and the bearing are satisfactorily demonstrated.

2. Specific Surface Area

The maghemite particles preferably have a large specific surface area. In order to move the maghemite particles to the bearing surface, a gas or a liquid that has a lower boiling point than the dispersion solvent is associated with the maghemite particles by adsorption, impregnation, or the like. The ability to associate the gas or liquid with the surfaces of the maghemite particles is directly proportional to the size of the specific surface area of the maghemite particles. For example, when a liquid is associated, 1 wt % or more of the liquid with respect to the maghemite particles is preferably associated in order to cause balloons to be formed and the maghemite particles to be moved to the bearing surface. Therefore, the BET value of the maghemite particles is preferably $10 \, m^2/g$ or higher, and a BET value of $21.5 \, m^2$ or higher is more preferred. For example, when maghemite particles having a BET value of $21.5 \, m^2/g$ are used as the impregnated material, the adsorption of the liquid can be increased to 2.5 wt % by placing the maghemite particles in a supersaturated steam atmosphere. The ability to associate the gas or liquid increases as the BET value increases, so a higher BET value is preferred, but movement of the maghemite particles together with the steam even after the particles have been left for 500 continuous hours at 85° C. has been confirmed when 2.5 wt % of moisture is adsorbed on maghemite particles having a BET value of $21.5 \, m^2/g$, for example. Therefore, a BET value of $40 \, m^2/g$ or less is adequate to make maghemite particles suitable for practical use.

3. Grain Size

When maghemite particles are used, the average grain size is preferably 0.3 µm or less, more preferably 0.15 µm or less, and more preferably 0.08 µm or less. Specifically, since the saturation magnetization of a single particle decreases with a reduction in the average grain size of the maghemite particles, the magnetic cohesion of the particles is easily released. The cohesion can thereby be released to a degree that the maghemite particles become singular or nearly singular, and the maghemite particles present in the gap between the shaft member and the bearing can therefore be prevented from striking the shaft member and the bearing, and satisfactory solid lubrication effects can be demonstrated. A small average grain size of the maghemite particles is more preferred, but when the average grain size is too small, the manufacturing cost increases, and when stress is applied to the particles, it is difficult for direct stress to be applied to the cohesive portions of the particles, and for the cohesion to be released. An average grain size of 0.01 µm or greater is therefore preferred.

The grain size distribution of the maghemite particles is also preferably small. The density of the maghemite particles usually increases in comparison to the density of the dispersion solvent. For example, even when the maghemite particles have nearly eight times the density of the dispersion solvent, the maghemite particles can be stably dispersed in the dispersion solvent by using maghemite particles that have a narrow grain size distribution.

The maghemite particles can be fabricated by heat treating and magnetically transforming magnetite particles, for example. The maghemite particles may also be fabricated by a wet process for forming particles in a liquid, or by another publicly known method. Maghemite particles fabricated by a wet process have a nearly spherical polyhedral shape. In a wet process, since the particles are precipitated while oxygen gas is streamed into iron sulfate or another dissolved solution, smaller particles are precipitated in a shorter time, and the size of the precipitated particles can be coordinated. When magnetite particles ($Fe_3O_4$) are heat treated in an oxygen-containing atmosphere, magnetic transformation occurs near 154° C. as shown in FIG. 2, and maghemite particles ($\gamma$-$Fe_2O_3$) are obtained. Since this magnetic transformation is an irreversible reaction, magnetically transformed particles in the maghemite particles do not return to the state of the original magnetite particles even when the temperature is at or below 154° C. When these maghemite particles are further heated in an oxygen-containing atmosphere, the particles are magnetically transformed into hematite particles ($\alpha$-$Fe_2O_3$) near 478° C. Maghemite particles created by magnetically transforming magnetite particles therefore have stable quality up to temperatures near 478° C., and are preferred from the perspective of thermal stability.

As shown in Table 1, in comparison to magnetite particles, the coercive force of the maghemite particles described above is increased about 10%, and the saturation magnetic flux density is decreased about 20%. Accordingly, the maghemite particles have pronounced permanent magnet qualities due to the increased coercive force, and are magnetically adsorbed with greater ease than magnetite particles. Due to reduced saturation magnetic flux density, the maghemite particles have a weaker magnetic cohesion force between particles than magnetite particles, and the magnetic cohesion is easily released. The grain size, specific surface area, and other particle characteristics of the maghemite particles are the same as in magnetite particles, and are substantially unchanged by magnetic transformation. Therefore, these characteristics of the maghemite particles can be controlled by controlling the characteristics of the magnetite particles during fabrication.

TABLE 1

|  | Magnetite | Maghemite |
|---|---|---|
| Coercive force Hc (Oe) | 178 | 195 |
| Residual magnetic flux density σr ($Am^2$/kg) | 14 | 11 |
| Saturation magnetic flux density σs ($Am^2$/kg) | 69 | 55 |
| Moisture content (%) | 2.5 | 2.0 |
| BET value ($m^2$/g) | 34 | 34 |
| Average grain size (µm) | 0.08 | 0.08 |

The same metal or alloy used in a conventional metal bearing may be used to form the sintered compact of the metal bearing according to the present invention, and no particular limitation is placed on the metal or alloy. Specifically, from the perspective of withstand load, impact resistance, radial crushing strength, clinching properties, durability, manufacturing cost, and other characteristics, the sintered compact of a conventional metal bearing may be one based on iron; iron and carbon; iron and copper; iron, copper, and carbon; iron, copper, and tin; or the like, depending on the application. All of these metals and alloys are ferromagnetic, and are therefore preferred for use in a metal bearing in which maghemite particles are used.

The dispersion solvent used in the metal bearing according to the present invention is not particularly limited, but preferably has the characteristics described below, for example.

1. Lubricity

The dispersion solvent preferably disperses the maghemite particles satisfactorily in the pores, and also exhibits the lubricating action of a liquid on the surface of sliding contact between the bearing surface and the shaft member after moving to the bearing surface. Damage to the surface of sliding contact between the bearing surface and the shaft member can thereby be prevented.

The dispersion solvent preferably has minimal change in viscosity due to temperature. Lubricity can thereby be maintained in a wide range of temperatures, and the dispersion solvent can therefore move smoothly in the gap between the bearing surface and the shaft member regardless of the temperature of the dispersion solvent. Consequently, abnormal noise can be prevented, sudden generation of heat on the surface of sliding contact can be suppressed, and hydrolysis and thermal decomposition of the dispersion solvent can be made less likely to occur.

Furthermore, the dispersion solvent is preferably thermally stable. Specifically, the dispersion solvent preferably does not thermally decompose or undergo hydrolysis or other chemical changes even at high temperatures. Lubricity can thereby be maintained on the surface of sliding contact between the bearing surface and the shaft member. Specifically, it is preferred that thermal decomposition and hydrolysis do not easily occur in the dispersion solvent at 150° C., more preferred that thermal decomposition and hydrolysis do not easily occur at 190° C., and even more preferred that thermal decomposition and hydrolysis do not easily occur at 200° C. or higher. Such a dispersion solvent can even be applied to automotive applications and other applications used in high-temperature atmospheres.

2. Dispersing Properties of the Maghemite Particles

The dispersion solvent is preferably lipophilic (i.e., hydrophobic) or nonpolar. In particular, dispersing hydrophilic maghemite particles associated with a polar alcohol or the like allows the dispersing properties of the dispersion solvent to be enhanced as the lipophilicity is increased, and lower polarity contributes to stable dispersion.

3. Moisture Absorbency

The dispersion solvent preferably has low moisture absorbency, and more preferably no moisture absorbency. Heating of the bearing surface causes moisture dissolved in the dispersion solvent to form steam balloons in the vicinity of the bearing surface and move together with the dispersion solvent to the bearing surface. The dispersion solvent is thereby wastefully consumed, and the self-lubricating properties of the maghemite particles are obstructed. Moisture also accelerates the hydrolysis of the dispersion solvent on the bearing surface. Therefore, the ratio of moisture present in the dispersion solvent is preferably low.

Examples of the dispersion solvent include (1) polyoxyethylene glycerin fatty acid esters in which ethylene oxide is additionally polymerized with mono fatty acid glycerin; (2) polyoxyethylene fatty acid esters in which ethylene oxide is additionally polymerized with a sorbitan fatty acid ester using an alkali catalyst; (3) polyoxyethylene sorbitol fatty acid esters or other ether ester-type nonionic surfactants in which ethylene oxide is added to sorbitol, and then esterified using a fatty acid; (4) polyethylene glycol fatty acid mono(di)esters in which polyethylene glycol and a fatty acid are esterified, or ethylene oxide is additionally polymerized with a higher fatty acid; (5) polyglycerin fatty acid esters or other ester-type nonionic surfactants in which a fatty acid is esterified using an alkali catalyst in polyglycerin obtained by condensation polymerization of glycerin; and poly-alpha-olefins, polyalkylene glycols, polyol diesters, and other synthetic oils. These solvents are nonpolar and highly lipophilic, and can therefore stably disperse maghemite particles with which alcohol or the like is associated as a liquid.

Among the examples described above, poly-alpha-olefins, polyol diesters, polyalkylene glycols, and other synthetic oils have excellent lubricity and other characteristics in addition to the ability to disperse the maghemite particles, and are therefore more preferred. For example, poly-alpha-olefins are preferred because the viscosity index thereof is easily increased, and the change in dynamic viscosity thereof is small in a wide range of temperatures. Poly-alpha-olefins also have a low pour point, the increase in dynamic viscosity thereof at low temperature can be suppressed, and hydrolysis does not easily occur therein due to the lack of moisture absorbency.

Poly-alpha-olefins are synthetic oils having an excellent viscosity index and pour point and the composition formula $C_{10}H_{21}$—[$CH(C_8H_{17})CH_2$]n-H, in which α olefin $CH_3(CH_2)_7$ $CH=CH_2$ is polymerized by ethylene. Poly-alpha-olefins vary in viscosity, boiling point, thermal decomposition properties, and other characteristics in accordance with the degree of polymerization thereof, but a poly-alpha-olefin in which the primary component has a molecular weight of approximately 500 and at least one degree of polymerization selected from 2 and 3 exhibits the characteristics described below, and is therefore particularly preferred.

The thermal decomposition temperature of this poly-alpha-olefin is near 230° C., and the start temperature of thermal decomposition is near 200° C. Therefore, thermal decomposition is unlikely to occur even after the dispersion solvent has seeped into the gap between the bearing and the shaft member. The boiling point is over 200° C. even at 0.1 atmospheres, and almost no evaporation occurs at atmospheric pressure. Therefore, the dispersion solvent can be made to exist as a liquid even after seeping into the gap of the shaft and the bearing. The viscosity index is also high, being 138, and lubricity can be maintained in a wide temperature range. Since the dynamic viscosity at 40° C. is low, being 31 cSt, the dispersion properties are not obstructed even when the maghemite particles are impregnated at low pressure in the pores, for example. The pour point is −57° C., an increase in dynamic viscosity at −30° C. can be suppressed, and use as a lubricating oil is still possible even at an extremely low temperature of −30° C.

In the metal bearing according to the present invention, the maghemite particles preferably have a surface modifying agent on the surfaces thereof. Specifically, the surfaces of the hydrophilic maghemite particles are modified by the surface modifying agent so as to be hydrophobic, whereby the ability to disperse the maghemite particles in the hydrophobic dispersion solvent can be enhanced, and the gas used to envelop the maghemite particles can be prevented from separating from the maghemite particles.

The surface modifying agent is preferably resistant to thermal decomposition; i.e., the thermal decomposition rate in response to an increase in temperature of the bearing surface due to sliding against the shaft member is preferably 5% or less. The surface modifying agent thereby adheres to the surfaces of the maghemite particles even after movement to the bearing surface. Specifically, since the properties of the surface modifying agent as such can be maintained insofar as the surface modifying agent does not undergo thermal decomposition even after moving to the bearing surface, the surface modifying agent can adhere to the surfaces of the maghemite particles at the bearing surface, and can bond with the dispersion solvent. Consequently, when such a surface modifying agent is used, as shown in the schematic view of FIG. 1, the surface modifying agent 6 is chemically adsorbed on the dispersion solvent 5 and the surfaces of the maghemite particles 4 at the sliding contact surface 3 of the bearing 1 with the shaft member 2. Since the dispersion solvent 5 is thus adsorbed via the surface modifying agent 6 on the surfaces of the maghemite particles 4, the maghemite particles 4 have the lubricating effects of a liquid through the adsorbed dispersion solvent 5, in addition to solid lubricating effects.

The surface modifying agent may also be a surfactant, a coupling agent, or another conventionally known surface modifying agent or magnetic ionic liquid. Examples of surfactants that may be used include fatty acid esters or derivatives of fatty acid esters, phosphoric acid ester nonionic and anionic surfactants, and the like. Since these compounds have hydrophilic and hydrophobic groups, the hydrophilic groups form hydrogen bonds with the surfaces of the maghemite particles, and the hydrophobic groups interact with the molecular chains of the dispersion solvent. The dispersion properties of the maghemite particles are thereby enhanced, and the gas adsorbed on the maghemite particles is thermally expanded, the surfactant works together with the dispersion solvent to suppress thermal expansion. Examples of the abovementioned phosphoric acid ester that may be used include ester mixtures composed of phosphoric acid monoesters and phosphoric acid diesters formed by reacting anhydrous phosphoric acid with polyoxyethylene isotridecyl alcohol in which ethylene oxide is added to isotridecyl alcohol. From the perspective of resistance to thermal decomposition, a carboxylic acid ester that has an isopropoxy group as the hydrophilic group and the group indicated by Formula (1) below as the hydrophobic group, for example, has a thermal decomposition rate of 2% at 180° C., and a thermal decomposition rate of 4% at 200° C. A phosphoric acid ester having the same hydrophilic group and the group indicated by Formula (2) below as the hydrophobic group has a thermal decomposition rate of 2% at 180° C., and a thermal decomposition rate of 5% at 200° C. Such surfactants have excellent resistance to thermal decomposition, and are therefore preferred for use.

[Formula 1]

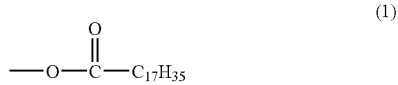
(1)

[Formula 2]

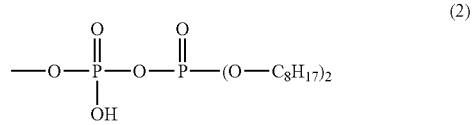
(2)

Such higher fatty acid esters and the like have a thermal decomposition of 2 to 5 wt % or less even at temperatures of 200° C. or higher. In contrast, the maximum temperature of the bearing surface in various types of automobile motors is between 120° C. and 150° C., and since there is almost no change in the composition of the surfactant even when the temperature increases to such a range, the maghemite particles do not lose liquid lubricating effects at the bearing surface. These surfactants form an adsorption film on the surface of metals and alloys based on iron, iron and copper, or iron, copper, and tin, and therefore function as oiliness agents and do not undergo any adhesion/abrasion due to direct contact between the bearing surface and the shaft member.

The same effects are obtained when a coupling agent is used as the surface modifying agent as when a surfactant is used. A titanium-based coupling agent, for example, may be satisfactorily used. A titanium-based coupling agent has a hydrophobic functional group and a hydrolysable hydrophilic functional group. The hydrophilic group therefore hydrolyzes with hydroxyl groups adsorbed on the maghemite particles, and a hydrophobic group forms on the maghemite particles. The maghemite particles can thereby be stably dispersed in the hydrophobic dispersion solvent.

The titanium-based coupling agent is not particularly limited, and the examples indicated by Formulas (3) through (5) below may be satisfactorily used. The carbon numbers of the alkyl chains, for example, are not particularly limited in Formulas (3) through (5) below.

[Formula 3]

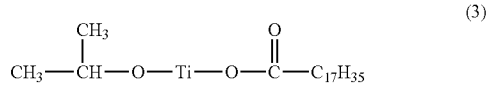
(3)

[Formula 4]

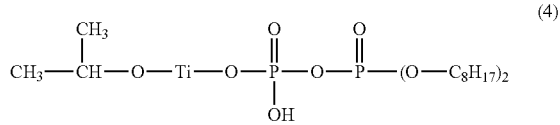
(4)

[Formula 5]

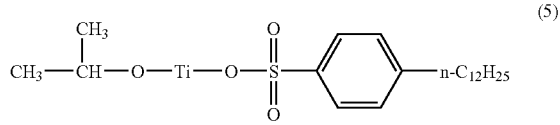
(5)

When the titanium-based coupling agent indicated by Formula (3) above is used, a fatty acid ester having an SP value of 8 to 9 is preferably used as the dispersion solvent because the SP value is 8.1. The titanium-based coupling agent indicated by Formula (4) has an SP value of 9.2, and the titanium-based coupling agent indicated by Formula (5) has an SP value of 9.6. Therefore, when these titanium-based coupling agent are used, a fatty acid ester having an SP value of 9 to 10 is preferably used as the dispersion solvent.

A silane-based coupling agent may also be used as the coupling agent. The silane-based coupling agent is not particularly limited, but a silane-based coupling agent that has a long-chain alkyl group having high affinity for the dispersion solvent is preferred. Examples thereof include a decyl trimethoxysilane, hexyl trimethoxysilane, phenyl triethoxysilane, or the like indicated by Formulas (6) through (8) below. These silane-based coupling agents have high boiling points of 132° C./10 mmHg, 202° C./10 mmHg, and 236° C./10 mmHg, respectively, and do not evaporate on the bearing surface. It is apparent that the carbon number of the alkyl chain or the carbon number of the alkoxy group of these silane-based coupling agents may be modified to any value.

[Formula 6]

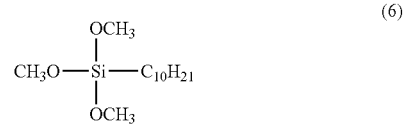
(6)

[Formula 7]

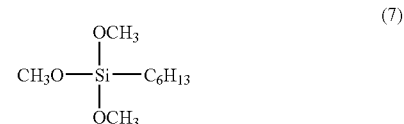
(7)

[Formula 8]

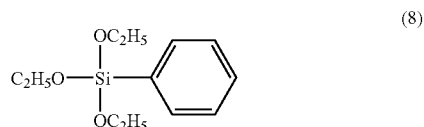
(8)

When the abovementioned silane-based coupling agents are used, the agents is prepared in an aqueous solution or an alcohol solution, added to maghemite particles with which moisture or alcohol is associated, and stirred for about 60 minutes. The solution is then allowed to stand at a temperature lower than the boiling point of water and alcohol, the silane-based coupling agents are allowed to adsorb on the surfaces of the maghemite particles, and the maghemite particles are dispersed in the dispersion solvent. Phenyltriethoxysilane is highly hydrophobic, and is therefore dissolved in an acetic acid water-alcohol-based solvent for use.

A fatty acid may also be used as the coupling agent. Specifically, the maghemite particles can be stably dispersed in the dispersion solvent through the reaction of a fatty acid with a hydroxyl group adsorbed on the maghemite particles and the use of the dispersion solvent whose HLB value is near the HLB value of the fatty acid.

The magnetic ionic liquid is not particularly limited, but a magnetic ionic liquid may be used that is provided with at least one type of negative ion selected from negative ions indicated by the formula $[Fe_xM_yN_zCl_4]^{n-}$ (wherein M and N are each transition metal atoms, $x+y+z=1$, and n is a number determined by x, y, and z). Specific examples include iron(III) oxide 1-ethyl-3-methylimidazolium chloride, iron(III) oxide 1-butyl-3-methylimidazolium chloride, iron(III) oxide 1-octyl-3-methylimidazolium chloride, and iron(III) oxide 1-decyl-3-methylimidazolium chloride having [FeCl$_4$]$^-$ in which x=1, y=z=0, and n=1 as the negative ion, and 1-ethyl-3-methylimidazolium, 1-butyl-3-methylimidazolium, 1-octyl-3-methylimidazolium, and 1-decyl-3-methylimidazolium as the positive ion. Such a magnetic ionic liquid is a paramagnet, but is capable of magnetic adsorption and coating to the ferromagnetic maghemite particles, and is therefore capable of dispersing the maghemite particles in the dispersion solvent. The reason for this is that since the maghemite particles are composed of an even number of magnetic domains accompanied by 180-degree magnetic walls, magnetic fluxes leak in the vicinity of the poles of the particles. The magnetic ionic liquid is magnetically adsorbed by the leaked magnetic fluxes. The first alkyl group is not particularly limited, but the higher the carbon number, the higher the degree of hydrophobicity, which is preferred, and the first alkyl group preferably has a carbon number of 6 to 20.

Since the thermal decomposition temperature of the above-mentioned magnetic ionic liquid is 280° C., the properties thereof are not obstructed even after movement to the bearing surface, and the magnetic ionic liquid is magnetically adsorbed on the maghemite particles. The magnetic ionic liquid also has almost no vapor pressure, and therefore does not evaporate even after moving to the bearing surface. Therefore, the lubricating effects of the maghemite particles can be increased by the liquid lubricating effects of the magnetic ionic liquid at the surface of sliding contact between the bearing surface and the shaft member.

When the surface modifying agent undergoes no chemical denaturation even in the environment of the gap between the bearing surface and the shaft member, after ferromagnetic microparticle clusters are discharged into the gap between the bearing surface and the shaft member, the surface modifying agent again envelops the periphery of the ferromagnetic microparticle clusters and bonds with the dispersion solvent, and the clusters of ferromagnetic microparticles are dispersed. Direct sliding contact between metals is thereby prevented by the presence of the surface modifying agent and the dispersion solvent even when the state of lubrication in the gap is one of boundary lubrication, and cohesion/abrasion on the bearing surface is thereby prevented. Even when the bearing surface is subjected to excessive stress from the shaft member, the presence of the dispersion solvent enveloping the ferromagnetic microparticles causes lubrication in which the ferromagnetic microparticles slip more easily, and the lubricating effects of the maghemite particles in the gap between the bearing and the shaft member can be enhanced.

The liquid associated with the maghemite particles present in the dispersion solvent has a lower boiling point than the primary component of the dispersion solvent, is thereby able to vaporize in the dispersion solvent. The gas and liquid with which the maghemite particles are associated is not particularly limited, but is preferably selected according to the temperature of the operating environment of the bearing, and the temperature increase of the bearing surface due to sliding against the shaft member. A liquid having a boiling point lower than the maximum temperature reached by the bearing surface is particularly preferred. Specifically, selecting a liquid for which vaporization is possible even when the temperature of the bearing surface is below the boiling point of the liquid, but whose boiling point is lower than the maximum temperature reached by the bearing surface makes it possible for the liquid to be reliably vaporized by the temperature increase of the bearing surface due to sliding against the shaft member. When a liquid is used whose boiling point is higher than the temperature of the bearing surface, the same effects can be obtained by additionally providing a device for heating the bearing surface.

When there is a wide range of temperatures of the operating environment or the bearing surface, it is possible to select a mixture of a plurality of types of gases or liquids having different boiling points. A plurality of types of gases or liquids may be mixed according to the respective vapor pressures thereof so that each gas or liquid may be used according to the temperature region, or by associating the gases or liquids with the maghemite particles in ratios according to the frequency of occurrence of temperatures on the bearing surface, the maghemite particles can be efficiently moved to the bearing surface according to the temperature range and frequency of occurrence of temperatures of the bearing surface even when the temperature of the bearing surface is changed by sliding contact. Both a gas and a liquid may also be associated with the maghemite particles.

For example, the maximum average temperature of the bearing surface in an automobile motor is 150° C. Consequently, when a liquid is associated with the maghemite particles, the maghemite particles are reliably discharged onto the bearing surface of the sintered compact when the boiling point of the liquid is in a range that reaches 130° C. The temperature range from normal temperature to 130° C. is divided into five to six regions of 20° C. each, and a liquid having a boiling point in each temperature region is associated with the maghemite particles. The maghemite particles can thereby be discharged onto the bearing surface of the sintered compact when the motor operates in a temperature range of −30° C. to 120° C. Dividing the temperature range from normal temperature to 130° C. more finely enables the liquid associated with the maghemite particles to efficiently move the maghemite particles to the bearing surface.

When the operating temperature of the bearing is an extremely low temperature of −30° C. or below, it is difficult for the maghemite particles to discharge to the bearing surface even when a liquid is associated that has a boiling point near room temperature. Consequently, when the manufactured product into which the bearing is built is started in such extremely low-temperature conditions, the maghemite particles and the dispersion solvent are not present on the bearing surface until a certain temperature is reached through sliding against the shaft member. Therefore, the bearing is preferably left for a certain period of time at a temperature equal to or above normal temperature prior to use so that the maghemite particles are allowed to seep onto the bearing surface in advance. For example, when the bearing is allowed to stand for 30 minutes at 60° C., and the bearing is built into the manufactured product and operated after a portion of the maghemite particles have seeped onto the bearing surface, satisfactory lubricity can be obtained from the start of operation. Furthermore, the same effects can also be obtained by associating a gas with the maghemite particles. Specifically, by associating a liquid that changes to a gas at or below the temperature at which use is started, for example, a state in which balloons envelop the maghemite particles occurs at the time of startup, and because the pressure of the balloons increases immediately after startup, the maghemite particles can be moved to the bearing surface.

Among a plurality of types of gases and liquids adsorbed on the maghemite particles, a plurality of gases and liquids may be associated with a single maghemite particles, different types of gas or liquid may be associated with a single maghemite particle, and the gas or liquid mixed may be arbitrarily selected according to compatibility with each other.

The means for associating the gas or liquid with the maghemite particles is preferably one in which the gas or liquid is present in a state of impregnation or adsorption with the maghemite particles. Through this means, even when a liquid vaporizes, and the gas thermally expands, there is no separation from the maghemite particles, and the liquid or gas can move to the bearing surface together with the maghemite particles.

Since magnetite, for example, has a hydroxyl group on the surface thereof, magnetite adsorbs water or alcohols, ethers, ketones, and many other organic solvents. When an organic solvent is selected with consideration for adsorption on magnetite and the temperature difference of the difference in boiling point in a temperature range from normal temperature to 130° C., examples include acetaldehyde (boiling point: 20.2° C.), diethyl ether (boiling point: 34.5° C.), dichloromethane (boiling point: 40.2° C.), ethyl formate (boiling point: 54.5° C.), methanol (64.7° C.), ethyl acetate (76.8° C.), ethanol (78.5° C.), cyclohexane (81.4° C.), 1-propanol (boiling point: 97.4° C.), water (boiling point: 100° C.), 1-butanol (boiling point: 117.6° C.), 2-methoxyethanol (boiling point: 124.5° C.), isobutyl acetate (boiling point: 126.3° C.), isopentyl alcohol (boiling point: 130.8° C.), and the like. By combining these liquids with consideration for the boiling point temperature differences, the maghemite particles can be discharged onto the bearing surface at a wide range of temperatures.

In an example of the method for manufacturing the metal bearing of the present invention, particles of maghemite are first prepared. The maghemite particles are obtained by heat treating magnetite particles fabricated by a wet process for 30 minutes at 180° C. to magnetically transform the magnetite particles into maghemite particles. Specifically, an oxidizing gas is streamed in a temperature range of 60 to 100° C. into an aqueous solution containing $Fe(OH)_2$, $FeCO_3$, or another Fe-containing precipitate obtained by mixing an aqueous solution of ferrous sulfate or another ferrous salt with sodium hydroxide, sodium carbonate, or another alkaline aqueous solution, a black precipitate is formed, and oxygen radicals and the like are rinsed away. In an alternative method, a mixed iron aqueous solution in which the ratio of $Fe^{2+}$ to $Fe^{3+}$ is 1:2 is prepared using an aqueous solution of ferrous sulfate or another ferrous salt and an aqueous solution of ferric sulfate or another ferric salt, one weight equivalent of NaOH or another alkaline aqueous solution is added to the mixed iron aqueous solution, the mixture is heated in a temperature range of 50 to 100° C., a black precipitate is formed, and oxygen radicals and the like are rinsed away. Granular magnetite particles can thereby be fabricated. The magnetite particles precipitated in water are then placed in a sealed vessel while still in the form of a slurry and processed for 30 minutes at 180° C., and the magnetite particles are transformed into maghemite particles. By handling the maghemite particles in a slurry state in this manner, maghemite particles on which water is adsorbed can be manufactured without advancing magnetic cohesion of the particles. When alcohol is adsorbed on the maghemite particles, the abovementioned black precipitate is washed with alcohol, and the maghemite particles are allowed to exist in alcohol.

In a case in which a coupling agent is used as the surface modifying agent, when the black precipitate described above is added to the dispersion solvent, for example, the coupling agent is mixed in a ratio of 2 wt %, more preferably 3 wt % or higher, with respect to the maghemite particles, and the mixture is then well stirred. The hydroxyl groups adsorbed on the surfaces of the maghemite particles thereby form hydrogen bonds with the hydrophilic groups of the coupling agent, the hydrophobic groups of the coupling agent interact with the long chains of the dispersion solvent, and the maghemite can be stably dispersed in the dispersion solvent. The same method may also be used when a surfactant is used as the surface modifying agent.

When a magnetic ionic liquid is used as the surface modifying agent, the magnetic ionic liquid is mixed together with the dispersion solvent in a ratio of 5 wt % or higher with respect to the slurried maghemite particles, and the mixture is then well stirred. The hydrophobic magnetic ionic liquid is thereby magnetically adsorbed on the maghemite particles, and a stable dispersion is obtained in the hydrophobic dispersion solvent.

The maghemite particles obtained in this manner are dispersed in the dispersion solvent. In order to reduce the degree of cohesion of magnetically cohered maghemite particles, the cohered portions of the maghemite must be subjected to shear force, compression force, and tensile force. The mixture ratio of maghemite particles and dispersion solvent is therefore preferably increased so as to be higher than the original mixture ratio of the maghemite and the dispersion solvent. Specifically, the dispersion solvent is adsorbed on the maghemite particles, particularly by using a surfactant or other surface modifying agent to mix and knead together the highly concentrated maghemite particles and the dispersion solvent. As a result, a highly viscous mixture of maghemite particles and dispersion solvent is formed. This type of high-concentration mixture of maghemite particles and dispersion solvent is charged into a pressurized kneader or other stirring device and kneaded, the dispersion solvent is further adsorbed on the maghemite particles as the mixture is kneaded, and the viscosity increases. After the adsorption of the dispersion solvent on the maghemite particles converges, and viscosity increases only slowly, shear force, compression force, tensile force, and various other types of stress are efficiently applied to the cohered parts of the maghemite particles when the kneader is furthermore rotated. The cohesion of the maghemite particles is therefore released, and maghemite particles can be obtained that have a low degree of cohesion, and in which the maghemite particle size is 200 nm or less. A mixed solution in which maghemite particles having a low degree of cohesion are dispersed is thus diluted by the dispersion solvent as needed and impregnated at low pressure in the pores of the metal or alloy sintered compact. By such a method as described above, maghemite particles can be associated with at least one of a gas and a liquid and confined in the pores.

Even when the degree of cohesion of the maghemite particles is reduced by kneading in a pressurized kneader device, because stress becomes difficult to directly apply to the cohered parts of the particles as the degree of cohesion decreases, the maghemite particles are still magnetically cohered, albeit to a significantly lower degree than prior to kneading. When such maghemite is discharged to the bearing surface, the maghemite receives stress in accordance with the surface state of the bearing surface and the shaft member. For example, in a state in which the convex part of the shaft member and the convex part of the bearing are against each other, and a load is transmitted from the shaft member to the bearing, the cohered maghemite particles are sandwiched by magnetic adsorption in a minute gap formed by both convex parts, and are subjected to stress from the shaft member. The cohesion of the adsorbed particles is thereby released, and the particles group with an even lower degree of cohesion. A large amount of stress acts at this time to release the magnetic cohesion. The conventional solid lubricating effects, e.g., the solid lubricating effects of graphite particles are due to sliding failure of the particles, but the solid lubricating effects in the present invention occur when groups of cohered particles are broken up through the action of direct stress on the contacting portions of groups of cohered particles. The solid lubricating effects are therefore due to the breaking up of cohesions of particles through slipping of the particle groups. The cohered particle groups discharged to the bearing and the shaft member are thus subjected to various types of stress, the degree of cohesion of the particles gradually decreases, and a coating composed of maghemite microparticles is formed.

Even in a case such as the one described above, there is a risk of the maghemite particles striking the shaft member or the bearing when the degree of magnetic cohesion is high in the maghemite particles discharged to the bearing surface, or when the bearing surface is subjected to excessive stress from the shaft member. The kneading time is therefore preferably increased, and the cohesion is preferably released to the degree that the maghemite particles are singular or nearly singular.

EXAMPLES

The present invention will be described in further detail using examples, but the present invention is in no way limited by the examples described.

Maghemite particles having an average grain size of 0.08 μm with a standard deviation of 0.05 μm in the grain size distribution, and a BET value of 34 m$^2$/g were used as the maghemite particles.

A poly-alpha-olefin having a viscosity index of 138, a dynamic viscosity of 31 cSt at 40° C., a dynamic viscosity of 5.8 cSt at 100° C., a pour point of −57° C., and a molecular weight of approximately 500 was used as the dispersion solvent.

The Ti-based coupling agent indicated by Formula (3) above was used as the surface modifying agent.

An amount of 3.5 wt % of the Ti-based coupling agent was then added to the slurry of maghemite particles on which water was adsorbed, and kneading was performed for 24 hours while adding a total of 10 wt % of the poly-alpha-olefin in minute quantities at a time. The poly-alpha-olefin was then mixed in and added so as to constitute 65 wt % with respect to the total weight, and the material for impregnation was manufactured.

The impregnation material was then impregnated at low pressure into a metal sintered compact and attached as a bearing component to a motor, and continuous operation of the motor was tested while varying the operating temperature and the operation time. The operation conditions of the motor were set to 72 minutes at 20° C., 144 minutes at 40° C., 360 minutes at 55° C., 504 minutes at 75° C., 288 minutes at 90° C., and 72 minutes at 120° C., and the motor was operated continuously through multiple cycles of this sequence of conditions.

As a result, abnormal noise or abnormal odor from the sliding contact surface was not observed even after 50 cycle repetitions, and abnormal noise occurred at the start of the 75$^{th}$ cycle, and was followed by abnormal odor.

As a comparative example, a motor using a conventional bearing was operated under the same conditions, and abnormal noise occurred at the start of the 5$^{th}$ cycle and was followed by abnormal odor.

As described above, in contrast to the operating environment temperature of −30° C. to over 100° C. for the conventional metal bearing, the metal bearing according to the present invention could be used as a bearing component in a temperature range of −40° C. to 120° C. Furthermore, it was apparent that the metal bearing of the present invention has 10 or more times the operating life of the conventional bearing in an environment of temperature cycles in which the temperature continuously varies in a range from 20° C. to 120° C.

INDUSTRIAL APPLICABILITY

The metal bearing according to the present invention can be applied in automotive solenoid valves, motor bearing components, and various other types of bearing components.

Figure 1:
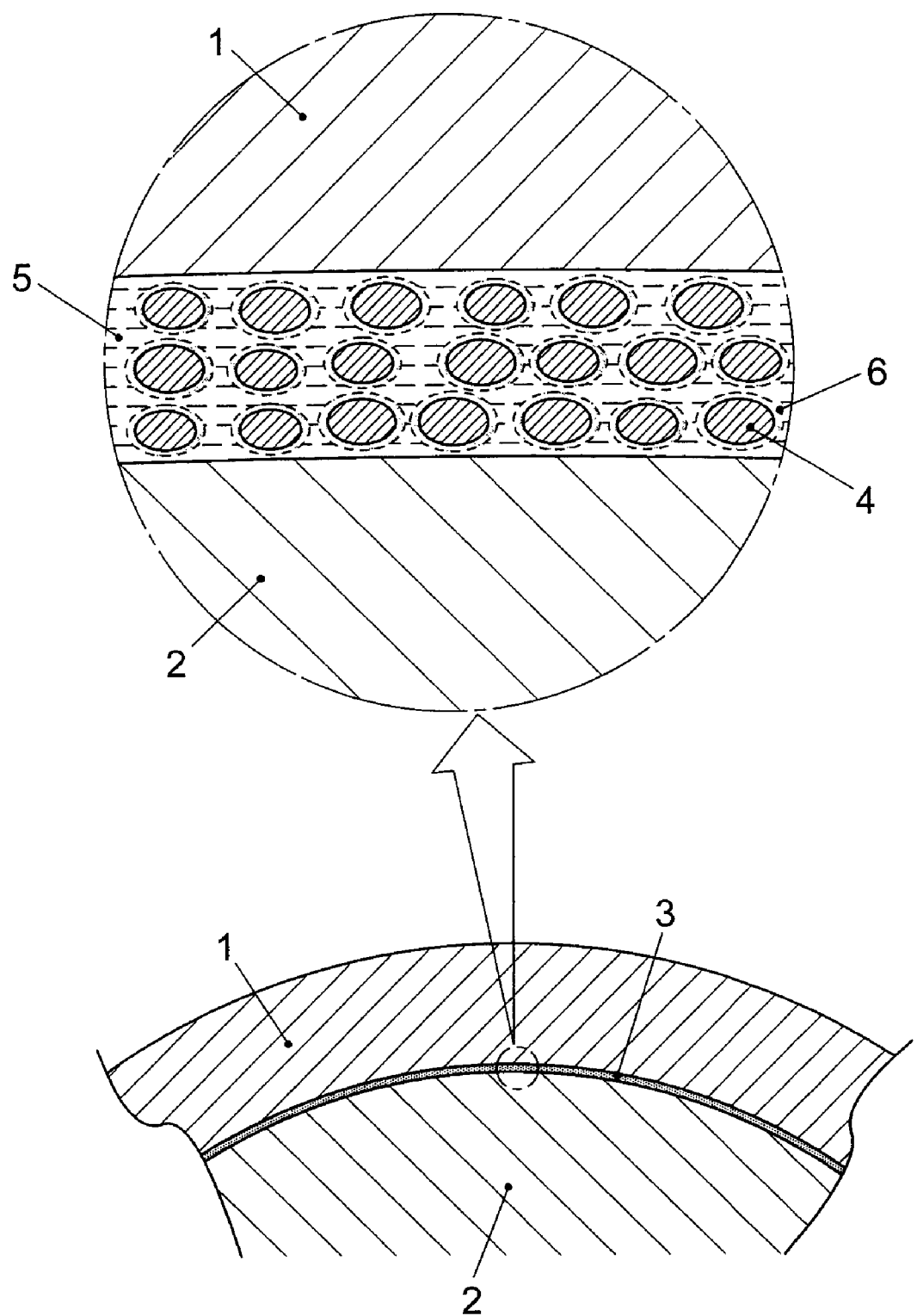
FIG. 1 is schematic view showing the state of maghemite particles at the surface of sliding contact between a shaft member and the metal bearing according to the present invention.
Figure 2:
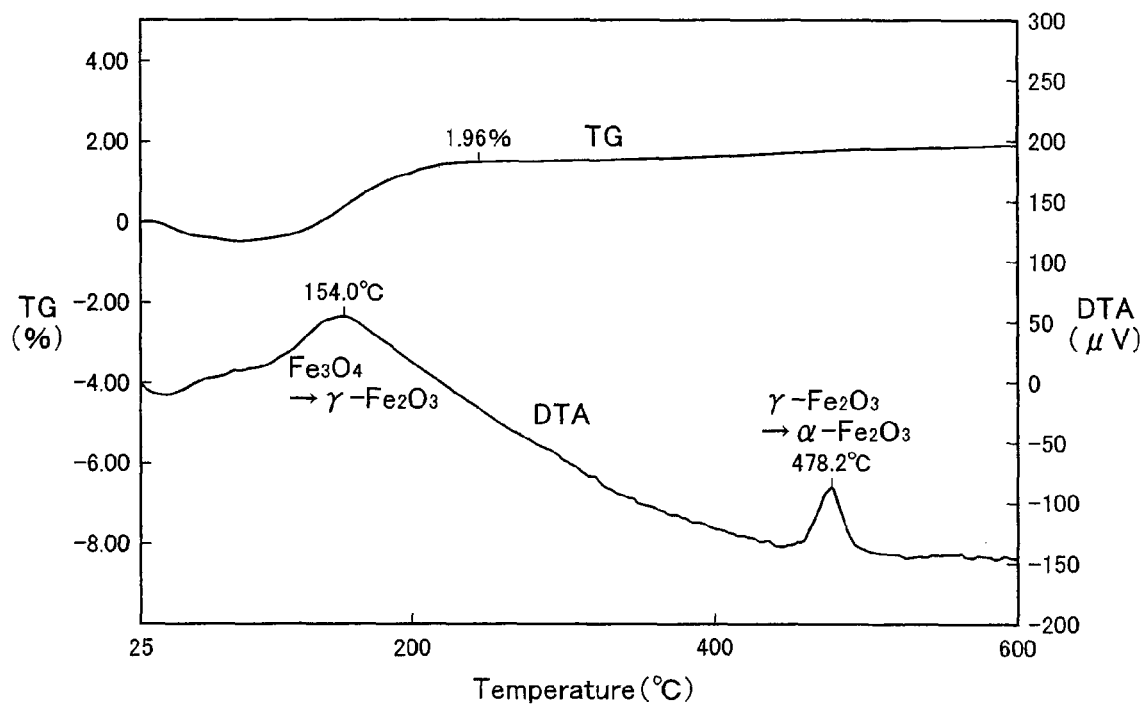
FIG. 2 is a graph showing the results of thermal analysis of the magnetite particles.

DESCRIPTION OF REFERENCE MARKS 1 bearing
2 shaft member
4 maghemite particles
5 dispersion solvent

The invention claimed is:

1. A metal bearing comprising:
a bearing surface capable of slidably contacting with a shaft member, including pores in a surface and interior thereof, and being composed of a sintered compact having a metal or alloy as a main component; wherein
a dispersion solvent is provided inside the pores, and maghemite particles exist in the dispersion solvent together with at least one of a gas and a liquid that has a boiling point lower than a boiling point of the dispersion solvent, wherein at least one of the gas or the liquid forms balloons that envelop the maghemite particles, inside the pores that are at or above a certain temperature.

2. The metal bearing according to claim 1, wherein an average grain size of the maghemite particles is 0.3 μm or less.

3. The metal bearing according to claim 2, wherein the dispersion solvent is a poly-alpha-olefin.

4. The metal bearing according to claim 1, wherein a BET value of the maghemite particles is 10 m$^2$/g or higher.

5. The metal bearing according to claim 4, wherein the dispersion solvent is a poly-alpha-olefin.

6. The metal bearing according to claim 1, wherein the maghemite particles are obtained by heat treating and magnetically transforming magnetite particles.

7. The metal bearing according to claim 6, wherein the dispersion solvent is a poly-alpha-olefin.

8. The metal bearing according to claim 1, wherein a surface of the maghemite particles is provided with at least one type of compound selected from a titanium-based coupling agent and a silane-based coupling agent.

9. The metal bearing according to claim 8, wherein the dispersion solvent is a poly-alpha-olefin.

10. The metal bearing according to claim 1, wherein the dispersion solvent is a poly-alpha-olefin.

11. The metal bearing according to claim 1, wherein the liquid evaporates and forms balloons as bubbles that envelop the maghemite particles, inside the pores that are at or above the certain temperature.

12. The metal bearing according to claim 1, wherein the gas forms balloons that envelop the maghemite particles, inside the pores that are at or above the certain temperature.

* * * * *